US012665820B2

(12) United States Patent
Hurford

(10) Patent No.: US 12,665,820 B2
(45) Date of Patent: Jun. 23, 2026

(54) METHOD AND SYSTEM FOR FILE DEPLOYMENT VIA DYNAMICALLY ASSIGNED LOCAL RELAYS

(71) Applicant: ZEBRA TECHNOLOGIES CORPORATION, Lincolnshire, IL (US)

(72) Inventor: Paul Hurford, Camberley (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 334 days.

(21) Appl. No.: 18/102,944

(22) Filed: Jan. 30, 2023

(65) Prior Publication Data

US 2024/0259275 A1 Aug. 1, 2024

(51) Int. Cl.
| | |
|---|---|
| *H04L 41/34* | (2022.01) |
| *H04L 41/00* | (2022.01) |
| *H04L 41/045* | (2022.01) |
| *H04L 41/082* | (2022.01) |

(52) U.S. Cl.
CPC ............ *H04L 41/34* (2022.05); *H04L 41/045* (2022.05); *H04L 41/082* (2013.01); *H04L 41/26* (2013.01)

(58) Field of Classification Search
CPC ..... H04W 84/12; H04W 88/04; H04W 40/22; H04B 2203/5445; H04L 45/741; H04L 2101/622; H04L 61/5007
See application file for complete search history.

(56) References Cited

U.S. PATENT DOCUMENTS

| | | | | |
|---|---|---|---|---|
| 8,139,554 B1 * | 3/2012 | Simon | ................... | H04W 40/12 |
| | | | | 455/243.1 |
| 10,911,911 B1 * | 2/2021 | Wang | .................... | H04W 4/029 |
| 2004/0111516 A1 * | 6/2004 | Cain | ..................... | H04W 76/18 |
| | | | | 709/227 |
| 2004/0121786 A1 * | 6/2004 | Radcliffe | ................ | H04L 67/12 |
| | | | | 455/500 |
| 2007/0005973 A1 * | 1/2007 | Mynam | ................. | H04L 9/3247 |
| | | | | 713/171 |
| 2007/0180078 A1 * | 8/2007 | Murphy | .............. | H04L 67/1023 |
| | | | | 709/223 |
| 2008/0046555 A1 * | 2/2008 | Datta | .................. | H04L 67/1055 |
| | | | | 709/243 |
| 2010/0162383 A1 * | 6/2010 | Linden | ................ | G06F 11/2028 |
| | | | | 726/13 |

(Continued)

*Primary Examiner* — Sandarva Khanal

(57) ABSTRACT

A method in a first client computing device among a plurality of client computing devices connected to a local area network (LAN) includes: receiving an update instruction from a device management subsystem external to the LAN; in response to receiving the update instruction, obtaining status data via the LAN for each of the client computing devices; based on the status data, determining whether to activate a controller operating mode at the first client computing device; in response to activating the controller operating mode, selecting, at the first client computing device, one of the plurality of client computing devices to operate in a local relay operating mode; instructing the selected client computing device to activate the local relay operating mode, for causing the selected client computing device to obtain an update file from the device management subsystem and to deploy the update file to the client computing devices via the LAN.

22 Claims, 9 Drawing Sheets

(56)  References Cited

U.S. PATENT DOCUMENTS

| | | | |
|---|---|---|---|
| 2011/0302607 A1* | 12/2011 | Warrick | H04N 21/41265 |
| | | | 725/39 |
| 2012/0008719 A1* | 1/2012 | Shirasuka | H04H 60/52 |
| | | | 375/316 |
| 2015/0178064 A1* | 6/2015 | Cairns | G06F 8/65 |
| | | | 717/171 |
| 2015/0181021 A1* | 6/2015 | Fry | G06Q 50/40 |
| | | | 455/406 |
| 2015/0193223 A1* | 7/2015 | Cardamore | G06F 9/44 |
| | | | 717/170 |
| 2016/0182626 A1* | 6/2016 | Endahl | H04L 67/1063 |
| | | | 709/203 |
| 2016/0192418 A1* | 6/2016 | Yang | H04W 76/14 |
| | | | 370/252 |
| 2017/0302513 A1* | 10/2017 | Aluvala | H04L 61/5014 |
| 2020/0367139 A1* | 11/2020 | Lei | H04W 72/04 |
| 2021/0397438 A1* | 12/2021 | Sirov | H04L 12/2834 |

* cited by examiner

| 104a-1 | 1.2.3.7 |
|--------|---------|
| 104a-2 | 1.2.3.5 |
| 104a-3 | 1.2.3.2 |
| 104a-4 | 1.2.3.8 |

Client mode

| 104a-3 | 1.2.3.2 |
|--------|---------|
| 104a-2 | 1.2.3.5 |
| 104a-1 | 1.2.3.7 |
| 104a-4 | 1.2.3.8 |

Controller Mode

METHOD AND SYSTEM FOR FILE DEPLOYMENT VIA DYNAMICALLY ASSIGNED LOCAL RELAYS

BACKGROUND

Computing devices, including mobile devices such as barcode scanners, mobile computers, portable printers, and the like, may be deployed in a wide variety of settings, such as transport and logistics facilities (e.g., warehouses and/or shipping facilities), healthcare facilities, and the like. A fleet of computing devices (e.g., hundreds or thousands of such devices) may be deployed across one or more facilities. Software updates, configuration file updates, and the like may be deployed to the fleet of devices from a centralized device management server. Deploying certain updates, such as operating system updates or the like, may involve the transmission of significant volumes of data, which may negatively impact the performance of the device management server and/or networking infrastructure at individual facilities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
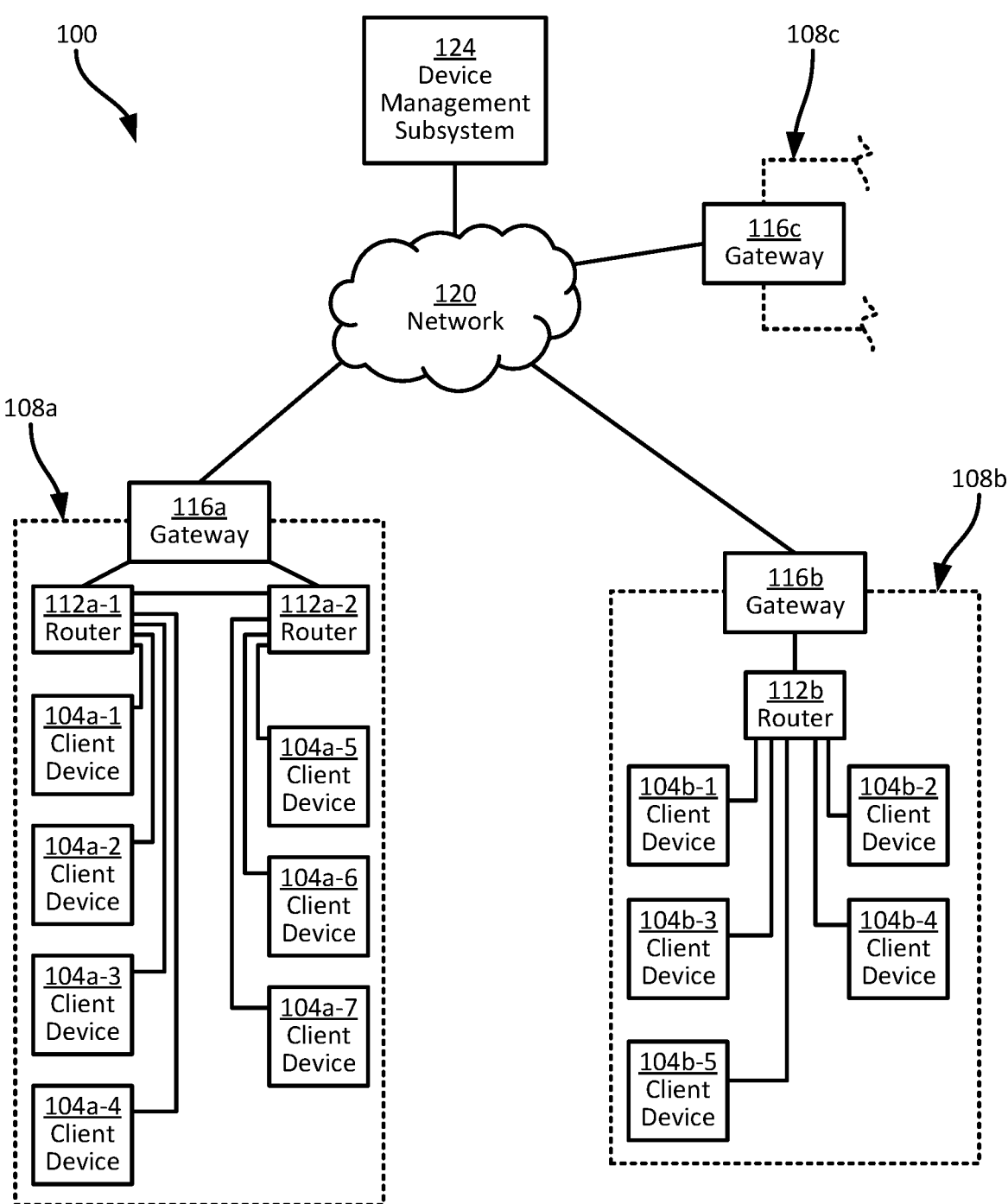
FIG. 1 is a diagram illustrating a file deployment system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a first client computing device among a plurality of client computing devices connected to a local area network, the method comprising: receiving an update instruction from a device management subsystem external to the local area network; in response to receiving the update instruction, obtaining status data via the local area network for each of the client computing devices; based on the status data, determining whether to activate a controller operating mode at the first client computing device; in response to activating the controller operating mode, selecting, at the first client computing device, one of the plurality of client computing devices to operate in a local relay operating mode; instructing the selected client computing device to activate the local relay operating mode, for causing the selected client computing device to obtain an update file from the device management subsystem and to deploy the update file to the client computing devices via the local area network.

Additional examples disclosed herein are directed to a computing device, comprising: a communications interface configured to establish a connection to a local area network; a memory; and a processor configured to: receive, via the communications interface, an update instruction from a device management subsystem external to the local area network; in response to receiving the update instruction, obtain status data from a plurality of computing devices connected to the local area network; based on the status data, determine whether to activate a controller operating mode at the first client computing device; in response to activating the controller operating mode, select one of the plurality of client computing devices to operate in a local relay operating mode; instruct the selected client computing device to activate the local relay operating mode, for causing the selected client computing device to obtain an update file from the device management subsystem and to deploy the update file to the client computing devices via the local area network.

FIG. 1 illustrates a file deployment system 100, including a plurality of client computing devices collectively referred to as client computing devices 104, or as devices 104. The devices 104 can include any suitable combination of mobile computing devices and fixed computing devices. Examples of such devices include tablet computers, wrist-mounted computers, smartphones, barcode scanners, portable printers, desktop computers, industrial equipment controllers, and the like.

The devices 104, in the illustrated example, can be deployed in a plurality of distinct facilities. Three example facilities 108a, 108b, and 108c are illustrated in FIG. 1, and are also collectively referred to as the facilities 108, and generically referred to as a facility 108. Similar nomenclature is used elsewhere herein to refer to like components collectively or generically. The facilities 108 can include warehouses, healthcare facilities, manufacturing facilities, and the like. As shown in FIG. 1, the devices 104 (which can also be referred to as a fleet of devices 104) is distributed between the facilities 108. In particular, the devices 104a-1, 104a-2, 104a-3, 104a-4, 104a-5, 104a-6, and 104a-7 are deployed at the facility 108a, and the devices 104b-1, 104b-2, 104b-3, 104b-4, and 104b-5 are deployed at the facility 108b. For simplicity of illustration, individual devices 104 are not shown in association with the facility 108c, but it will be understood that the facility 108c can also house any number of devices 104.

The system 100 can include a greater number of facilities 108 than illustrated, or fewer facilities 108 than illustrated (e.g., as few as one facility 108). Further, the number of devices 104 at a given facility 108 can vary widely. One or more of the facilities 108, for example, can contain hundreds or thousands of devices 104. At each facility 108, the devices 104 can connect to a local area network, e.g., implemented by one or more wireless access points, switches, routers, and the like. For example, the facility 108*a* includes first and second routers 112*a*-1 and 112*a*-2, and may also include further networking elements such as Ethernet switches, wireless access points, and the like. The routers 112*a* implement a local area network at the facility 108*a*, and each router 112*a* can implement a subnetwork within the local area network. In the illustrated example, the devices 104*a*-1 to 104*a*-4 constitute a first pool of devices 104, connected to a first subnet (via the router 112*a*-1). The devices 104*a*-5 to 104*a*-7 constitute a second pool of devices 104, connected to a second subnet (via the router 112*a*-2). In other example facilities 108, such as the facility 108*b*, the devices 104*b*-1 to 104*b*-5 constitute a single pool of devices 104, connected to a router 112*b*. That is, the local area network at the facility 108*b* need not be divided into subnetworks, in the illustrated example.

The devices 104 at a given facility 108 can communicate with other computing devices external to that facility 108 via a gateway 116. Respective gateways 116*a*, 116*b*, and 116*c* are illustrated for the facilities 108 in FIG. 1. The gateways 116 can be integrated with the routers 112 or other networking infrastructure in some examples, but are illustrated as separate elements in FIG. 1 for clarity. The gateways 116 can be connected with one or more wide-area networks, illustrated as a network 120.

Among the external computing devices with which the devices 104 can be configured to communicate is a device management subsystem 124, which can be implemented as a server and/or a set of servers (e.g., geographically distributed in some examples, dependent on the geographic extent of the facilities 108) external to some or all of the local area networks at the facilities 108. The subsystem 124 can be configured to deploy updated software, configuration data, and the like, to the devices 104 at one or more of the facilities 108. For example, when an updated version of an operating system (OS) employed by the devices 104 becomes available, the subsystem 124 can be configured to instruct each device 104 to retrieve a file or set of files containing the updated OS version, and to install the update. The subsystem 124 can also, in some examples, enable an operator of the fleet of devices 104 to monitor the deployment of the update across the fleet of devices 104 from a centralized dashboard or the like.

Certain updates, such as updated OS versions, may involve the provision of a relatively large file (e.g., about 1.5 GB, although this file size is provided purely for illustrative purposes) to each device 104 in the system 100. When the fleet includes hundreds or thousands of devices 104, the total volume of data to be served by the subsystem 124 can therefore be significant. For example, distributing a 1.5 GB update file to a fleet of fifty thousand devices 104 distributed across five hundred facilities (e.g., with one hundred devices 104 per facility) involves uploading 75 TB at the subsystem 124. Some upload volumes may negatively impact the performance of the subsystem 124, e.g., by imposing significant loads on storage devices, computational resources, and/or available network bandwidth at the subsystem 124.

Further, at each facility 108, the provision of a 1.5 GB update file to each device 104 at the facility 108 may negatively affect the performance of the gateway 116. For example, a gateway 116 for a site with one hundred devices 104 in the above scenario may be called upon to deliver 150 GB of data to the devices 104 onsite, in addition to all other network traffic to and from the facility 108. In other words, some update operations may place demands on the subsystem 124, the gateways 116, and/or the routers 112, that are sufficiently high as to interfere with other operations of those components, and/or result in failure or delay of the update operation.

As discussed below, the devices 104 implement certain functionality to mitigate the impact of update operations on the performance of the components of the system 100. The functionality set out below configures the devices 104 to dynamically assign one or more devices 104 at each facility 108 to act as a local relay for update files from the device management subsystem 124. The assignment of local relays need not be computed by the subsystem 124, but can instead be determined by the devices 104 themselves. Further, the assignment of devices 104 to act as local relays permits a small number of copies of an update file (e.g., as few as a single copy per facility 108) from the subsystem 124. The local relay can then distribute the update file(s) to the other devices 104 at the same facility 108, imposing little or no further load on the corresponding gateway 116, or on the subsystem 124. Still further, using devices 104 as local relays may reduce or eliminate the need for other potentially costly solutions, such as dedicated local relay servers deployed at each facility 108.

Figure 2:
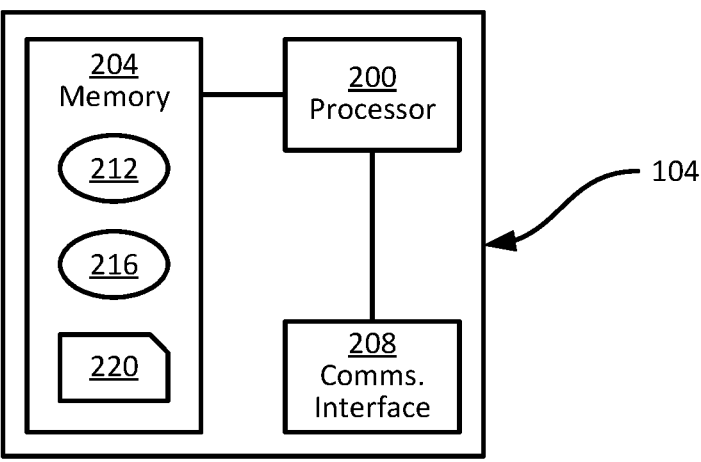
FIG. 2 is a diagram of certain components of a client computing device of the system of FIG. 1.

Before discussing the functionality implemented by the devices 104, certain internal components of the devices 104 are illustrated in FIG. 2. Although the form factors and specific nature of the components shown in FIG. 2 may vary between devices 104, each device 104 includes the components shown in FIG. 2. Specifically, each device 104 includes a processor 200, such as a central processing unit (CPU) and/or graphics processing unit (GPU), application-specific integrated circuit (ASIC), or the like, communicatively coupled with a non-transitory computer-readable storage medium such as a memory 204. The memory 204 can include a suitable combination of volatile memory elements (e.g., random access memory (RAM)) and non-volatile memory elements (e.g., flash memory or the like).

The device 104 also includes a communications interface 208, enabling the device 104 to establish connections with the local area networks mentioned in connection with FIG. 1 (e.g., with a router 112). The communications interface 208 can therefore include any suitable combination of transceivers, antenna elements, and corresponding control hardware enabling communications with the routers 112. In some examples, the communications interface can also include physical ports or contacts, e.g., for establishing a wired (e.g., Ethernet) connection to a router 112 when the device 104 is in a charging cradle with a wired connection to the router 112.

The device 104 can include further components (not shown), including output devices such as a display, a speaker, and the like, as well as input devices such as a keypad, a touch screen, a microphone, and the like.

The memory 204 stores a plurality of computer-readable instructions in the form of applications. In the illustrated example, a first application 212 is shown, such as an operating system or other application whose execution by the processor 200 configures the device 104 to perform various functions within the facility 108. The application 212 can be the target of an update operation initiated by the device management subsystem 124, as discussed below. The applications stored in the memory 204 also include an update management application 216, whose execution by the processor 200 configures the device 104 to implement functionality to dynamically assign certain devices 104 as local relays for assisting update operations initiated by the device management subsystem 124.

The memory 204 also stores, in this example, a configuration file 220, containing various configuration settings used by the processor 200 during execution of the application 216. The configuration file 220 can be deployed to the device 104 during staging of the device 104 (e.g., when the device is first deployed to the corresponding facility 108).

Figure 3:
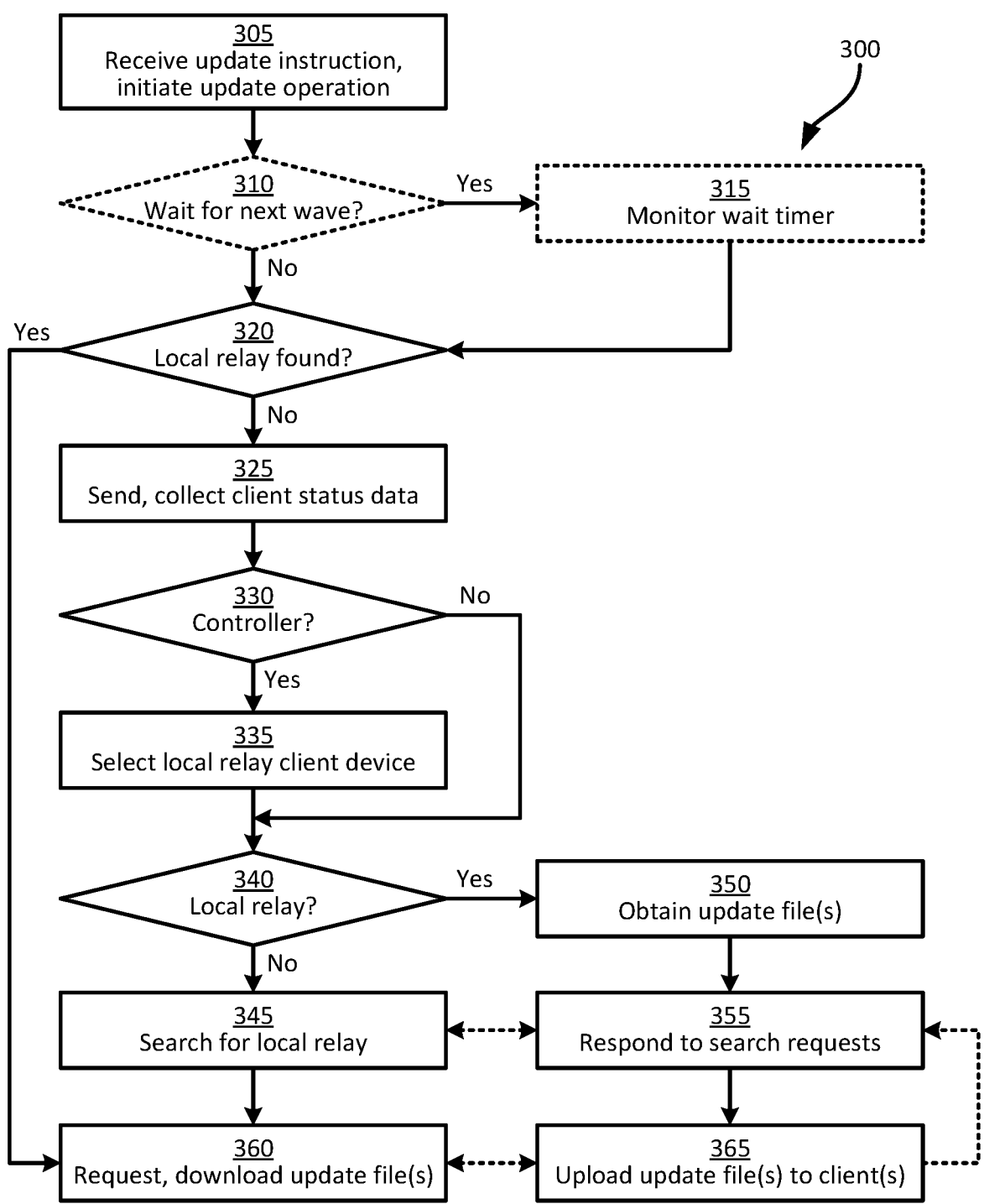
FIG. 3 is a flowchart of a method for file deployment via dynamically assigned local relays.

Turning to FIG. 3, a method 300 of file deployment via dynamically assigned local relays is illustrated. The method 300 is discussed below in conjunction with an example performance of the method 300 within the system 100, although it will be understood that the method 300 can also be implemented in other systems. The blocks of the method 300 can be performed by each device 104 in the system 100. Through the substantially parallel performance of the method 300 by each of the devices 104, certain devices 104 are dynamically assigned as local relays for the purpose of obtaining and distributing update files from the device management subsystem 124.

Figure 4:
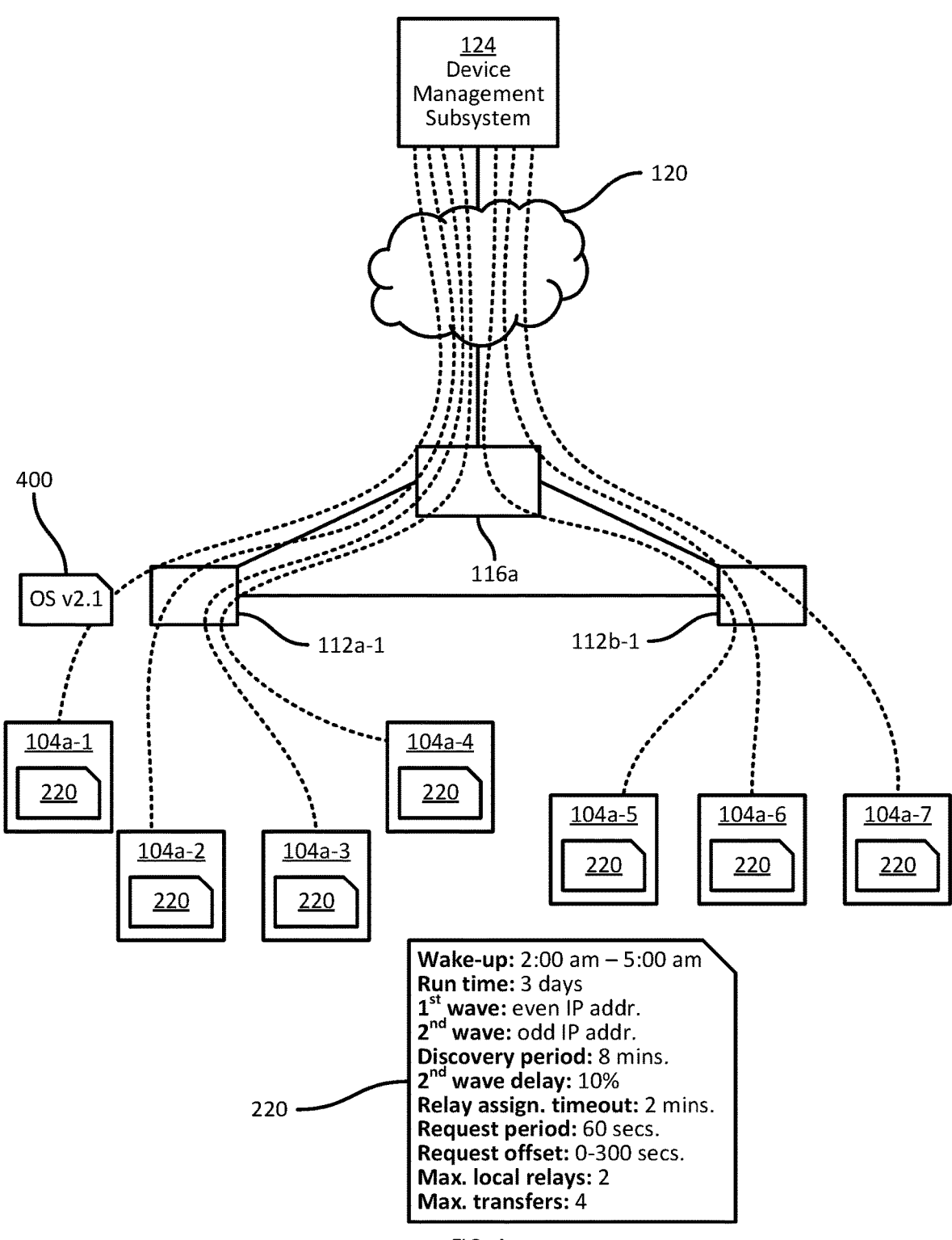
FIG. 4 is a diagram illustrating an example performance of block 305 of the method of FIG. 3, and an example configuration file employed in the method of FIG. 3.

At block 305, the device 104 is configured to receive an update instruction, e.g., from the subsystem 124, and to initiate an update operation. The subsystem 124 can, for example, be controlled by an operator to generate and send update instructions, or can detect available updates and send update instructions automatically. As shown in FIG. 4, the subsystem 124 can generate and send an instruction 400 to each device 104 in the system 100. For simplicity, FIG. 4 illustrates only the devices 104 at the facility 108*a*. Each device 104*a* at the facility 108*a* receives an instruction 400, containing in this example a version identifier (e.g., "v2.1") for the operating system 212. The instruction 400 can also contain various other information, such as a uniform resource locator (URL) indicating a storage location at the subsystem 124 from which the software update can be obtained. The instruction 400 need not be identical for every device 104*a*. For example, the subsystem 124 can establish secure connections with the devices 104*a*, and each instance of the instruction 400 can therefore be signed or otherwise secured for delivery to a specific device 104*a*.

The instruction 400 can also contain update criteria, such as a current version of the OS 212 that is eligible for the update, a device type that is eligible for the update, or the like. In the present discussion of the method 300, it is assumed that the devices 104*a* are sufficiently similar such that any update criteria are met by all the devices 104*a*. The criteria defining whether a given device 104 is eligible for the update can also include, in addition to or instead of a software version, an indication of whether the device 104 is currently charging (e.g., in a charging cradle), a network quality indicator (e.g., received signal strength indicator (RSSI) for a wireless network), a battery level, or the like.

In response to receiving the update instruction 400, each device is configured to initiate an update operation at block 305 according to the configuration file 220. FIG. 4 also illustrates example contents of the configuration file 220. The configuration file includes, in the illustrated example, timing parameters including an active period (e.g., "wake-up") during which the devices 104 are configured to execute the update operation. The timing parameters can also include a total run time (e.g., "Run time"), specifying a time period for which the update operation is scheduled to run. The parameters illustrated in FIG. 4, for example, indicate that the update process is scheduled to run between the hours of 2:00 am and 5:00 am, for three days (e.g., three periods of three hours each). The devices 104 can be configured to implement an alarm according to the configuration file 220 to wake up at the specified time. Various other time periods can be specified in other implementations, and the timing parameters in the configuration file 220 need not appear as shown in FIG. 4. For example, instead of an active period and a number of days, the configuration file 220 can indicate specific days and times, and/or a start time, a run time length (e.g., for each day), and an end date.

In the present example, the devices 104*a* are configured to begin execution of the update operation defined by the application 216 at the time specified by the configuration file 220 (e.g., 2:00 am). Initiation of the update operation can include switching from a low-power state (e.g., a sleep state) to a full-power state, in some examples.

Referring again to FIG. 3, the devices 104 can optionally determine, at block 310, whether to proceed with the update operation upon initiation, or whether to delay the update operation for a predetermined time period. The determination at block 310 divides the pool of devices 104 into waves. Devices 104 self-assigning to a first wave are configured to proceed with the update operation, and devices 104*a* self-assigning to a second wave are configured to wait until a portion of the update operation has been completed by the devices 104 of the first wave. Dividing a pool of devices 104 (e.g., the devices 104 in a subnetwork, or the devices 104 in a facility 108) into waves can mitigate the load imposed on the local area network to which the pool of devices 104 is connected, e.g., if the pool of devices 104 is large relative to the capacity of the local area network.

The determination at block 310 is made according to the configuration file 220. As shown in FIG. 4, the configuration file 220 includes a wave assignment setting ("$1^{st}$ wave") defining a criterion by which each device 104 self-assigns to the first wave or the second wave. The configuration file 220 can include a second wave assignment setting ("$2^{nd}$ wave") defining a criterion by which each device 104 self-assigns to the first wave or the second wave. In other examples, the second wave assignment setting can be omitted, and devices 104 can self-assign to the second wave when they do not meet the criterion defined by the first wave assignment setting. In the illustrated example, the wave assignment setting specifies that devices 104 with even Internet Protocol (IP) addresses (e.g., in which the final octet is even) self-assign to the first wave, resulting in a negative determination at block 310. Devices 104 with odd IP addresses self-assign to the second wave, resulting in an affirmative determination at block 310. Various other wave assignment settings may be defined by the configuration file 220, and need not be based on IP addresses or specific portions thereof (e.g., the last octet of an IP address). In some examples, the configuration file 220 can define criteria facilitating self-assignment by the devices 104 into more than two waves (e.g., a command for each device 104 to generate a random number in a range corresponding to the desired number of waves). The evaluation of IP addresses for evenness can facilitate division of a pool of devices 104 into waves with substantially equal numbers of devices 104, even when the number of currently active devices 104 is not known to any individual device 104, as IP addresses are generally assigned sequentially to active devices 104.

When the determination at block 310 is affirmative, at block 315 the device 104 is configured to initiate and monitor a wait timer, according to the configuration file 220. The configuration file 220 includes one or more settings defining the wait timer. In this example, the settings defining the wait timer include a length of a discovery time period ("Discovery period" as shown in FIG. 4), and a wave delay buffer ("$2^{nd}$ wave delay" in FIG. 4). The second wave of devices 104 are configured to skip a discovery process performed by devices 104 of the first wave. Any device performing block 315 can therefore set a wait timer equivalent to the discovery time period, added to the wave delay buffer. In the example illustrated in FIG. 4, the wait timer is eight minutes and forty-eight seconds (eight minutes, plus ten percent of eight minutes). A wide variety of other settings can also be employed to set the wait timer, in other examples.

When the wait timer expires, the device 104 is configured to proceed to block 320. Devices 104 in the first wave are configured to proceed directly from block 310 to block 320, and therefore perform block 320 before the devices 104 of the second wave. In this example performance of the method 300, blocks 310 and 315 are omitted because the number of example devices 104*a* at the facility 108*a* is relatively small, and wave separation may therefore be unnecessary to mitigate network load at the facility 108*a*.

Each device 104*a* therefore proceeds from block 305 to block 320. At block 320, each device 104*a* is configured to seek a local relay among the other devices 104*a*, and determine whether a local relay can be found. Seeking a local relay can be performed by broadcasting a search request, to which any devices 104*a* operating in a local relay mode are configured to respond, as discussed further below. If no responses are received to a search request, e.g., within a predetermined time period, the determination at block 320 is negative, and the device 104*a* is configured to proceed to block 325. When the determination at block 320 is affirmative, the discovery process can be skipped, as discussed in greater detail below. For illustrative purposes, the present example performance of the method 300 is the first performance of the method 300 since transmission of the update instruction 400 by the subsystem 124. No local relays have yet been assigned, and the determination at block 320 is therefore negative for each device 104*a*. Each device 104*a* therefore proceeds to block 325.

At block 325, each device 104*a* is configured to execute a discovery process in which the device 104*a* exchanges status data with any other devices 104*a* in a pool (e.g., in the same subnetwork). In the present example, at block 325 the devices 104*a*-1 to 104*a*-4 (a first pool) can exchange status data, and the devices 104*a*-5 to 104*a*-7 (a second pool) can exchange status data. The devices 104*a* of the first pool need not exchange status data with the devices 104*a* of the second pool. Restricting the discovery process to devices 104*a* in a given pool, such as a subnetwork, can reduce the total volume of status data to be collected by each individual device 104*a*. In other examples, as in the case of the facility 108*b*, all the devices 104*b* can exchange status data (e.g., the devices 104*b*-1 to 104*b*-5 are members of a single pool).

Figure 5:
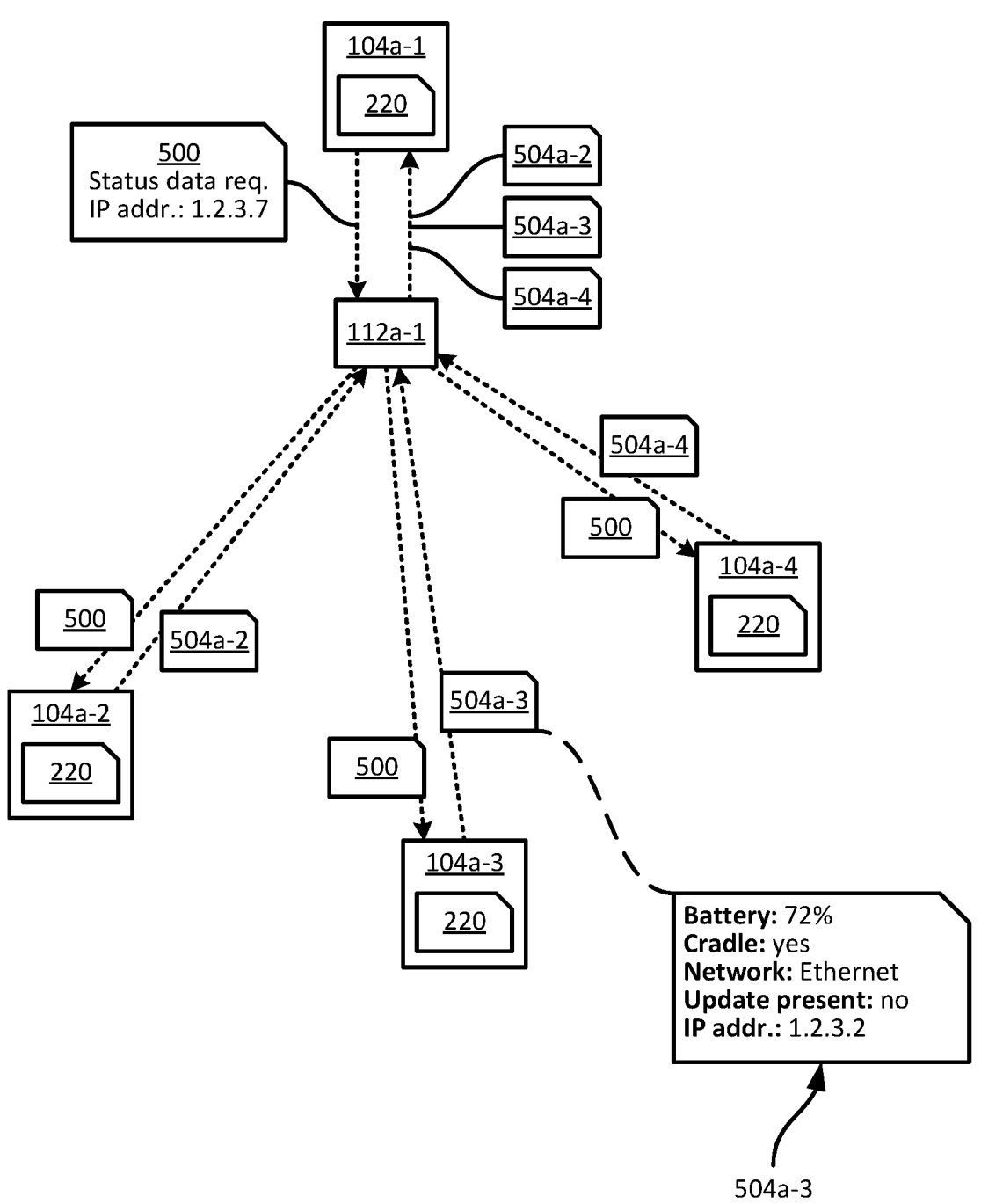
FIG. 5 is a diagram illustrating an example performance of block 325 of the method of FIG. 3.

FIG. 5 illustrates an example portion of the discovery process initiated at block 325, within the first pool of devices 104*a*-1 to 104*a*-4. As shown in FIG. 5, the device 104*a*-1 broadcasts (e.g., via a User Datagram Protocol (UDP) broadcast) a status data request 500, which the router 112*a*-1 is configured to transmit to any device 104*a* within range. The request 500 includes a network address of the sender, such as an IP address, and a field, flag, or the like identifying the request 500 as a request for status data. In other examples, the request 500 can also include status data for the device 104*a*-1.

In response to receiving the request 500, each of the devices 104*a*-2, 104*a*-3, and 104*a*-4 is configured to transmit, e.g., in a message or set of messages addressed to the device 104*a*-1, respective status data 504*a*-2, 504*a*-3, and 504*a*-4. Each of the devices 104*a*-2, 104*a*-3, and 104*a*-4 can also broadcast requests for status data, to which the other devices 104*a* are configured to respond. The devices 104*a* can employ any suitable contention-based access protocol, round-robin alternation, or the like, to avoid congestion resulting from simultaneous broadcasts 500 and/or status data messages 504. Various discovery protocols and other mechanisms, e.g., Address Resolution Protocol (ARP) can be employed during the performance of block 325. In some examples, e.g., in which ARP is enabled during the discovery process, the devices 104 can be configured to discard status data obtained during discovery from other devices on the network that are not compatible with the updated deployment system (e.g., certain peripherals, Internet-of-Things (IOT) devices, and the like, may not be configured to implement the update deployment process described herein).

The exchange of status data, e.g., including repeated broadcasts and replies, can continue for the discovery time period specified in the configuration file 220 (e.g., eight minutes in this example). In some examples, upon expiry of the discovery time period, the performance of block 325 can also include establishing a connection (e.g., via transport control protocol (TCP) or the like) at each device 104*a* in the pool with each other device 104*a* in the pool from which status data was received. Via the established connection, each pair of devices 104*a* in the pool can exchange status data (e.g., to confirm and/or update status data). The establishment of such connections and final confirmatory exchange of status data can be omitted in some examples, however.

The status data 504 exchanged by the devices 104 at block 325 includes various attributes that can be used to determine which device 104 to assign as a local relay for deploying update files to the remaining devices 104 in the same pool. The status data 504*a*-3, for example, as illustrated in FIG. 5, contains a battery charge level, an indication of whether the device 104*a*-3 is currently in a charging cradle, and an indication of what type of network connection the device 104*a*-3 is currently using (e.g., wired/Ethernet, or wireless). The status data can also include an indication of whether the update file (e.g., the updated version of the operating system 212 specified in the instruction 400) is already present at the device 104*a*-3, as well as an IP address or other network identifier of the device 104*a*-3.

Returning to FIG. 3, at block 330, each device 104*a* is configured to determine whether to activate a controller operational mode. When operating in the controller mode, a device 104 is configured to select a device 104 in the same pool as a local relay, and instruct the selected device to activate a local relay mode, discussed below. Any devices 104 that make a negative determination at block 330 activate a client operating mode, also discussed below.

Figure 6:
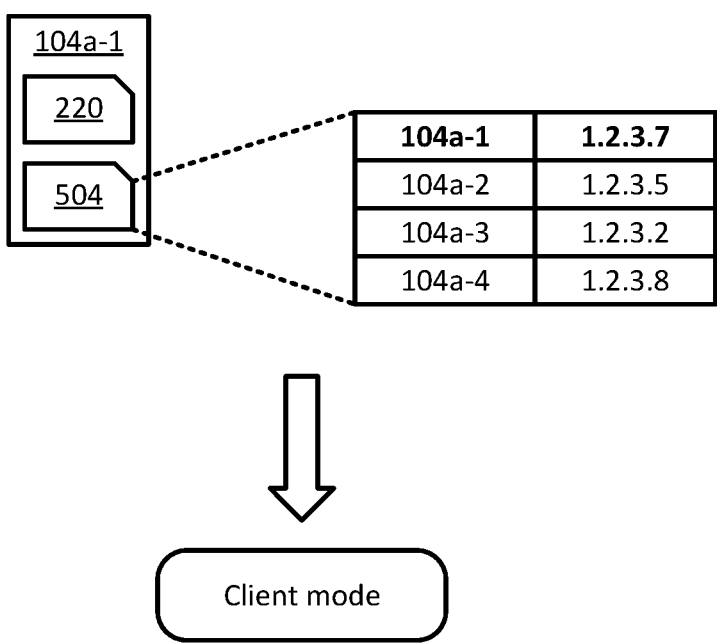
FIG. 6 is a diagram illustrating example performances of block 330 of the method of FIG. 3.
Figure 6:
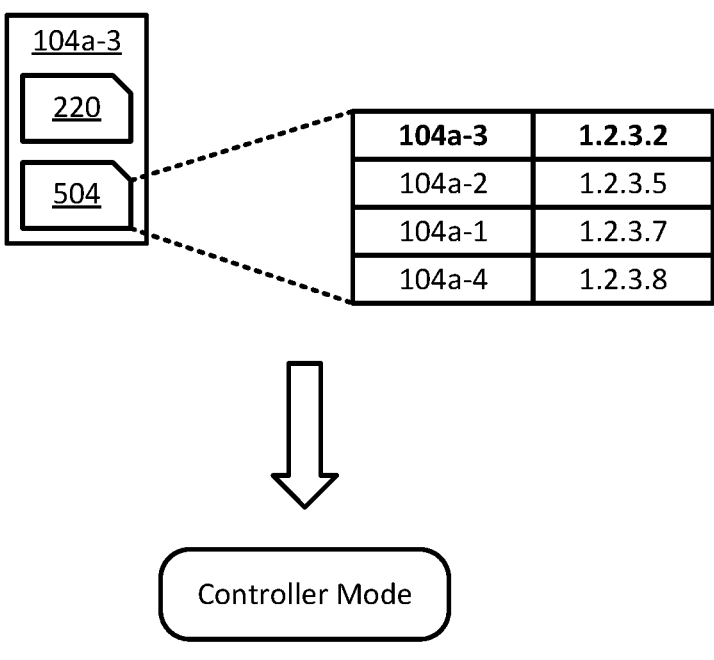

The determination at block 330 can include, at a given device 104, determining whether that device 104 has the lowest IP address among the devices 104 in the pool discovered via block 325. Various other attributes can also be employed in the determination at block 330 instead of IP addresses, such as media access control (MAC) addresses, serial numbers, or the like. FIG. 6 illustrates example performances of block 330 by each of the devices 104*a*-1 and 104*a*-3. Each device 104*a* shown in FIG. 6 stores collected status data 504, which includes IP addresses for each of the devices 104*a*-1 to 104*a*-4. As seen in FIG. 6, the IP address of the device 104*a*-1 is not the lowest among those represented in the status data 504, and the determination at block 330, as performed by the device 104*a*-1, is negative. The device 104*a*-1 may therefore activate a client operating mode, rather than a controller operating mode.

The device 104*a*-3 has the lowest IP address among the devices 104*a*-1 to 104*a*-4, and the determination at block 330, as performed by the device 104*a*-3, is therefore affirmative. The device 104*a*-3 therefore activates the controller operating mode.

Returning to FIG. 3, when the determination at block 330 is affirmative, the device 104*a*-3 (having activated the controller operating mode) is configured to select one of the devices 104*a* in the same pool (that is, the devices 104*a*-1 to 104*a*-4 in this example) to operate as a local relay. The selection at block 335 is based on the status data, e.g., to identify the device 104*a* that is most suited to retrieving update file(s) from the subsystem 124 and deploying the update file(s) to the other devices 104*a*. The selection at block 335 can include, for example, assigning scores to each device 104*a* (including the controller device 104*a*-3) based on whether the device 104*a* satisfies various criteria, with the highest-scoring device 104*a* being selected. Example criteria include whether a given device 104*a* has a copy of the relevant update file(s) in local memory 204, whether the device 104*a* has a battery charge level above a threshold or is connected to a charge cradle, and whether the device 104*a* has a wired network connection.

In response to selecting the local relay, the controller device 104*a*-3 is configured to transmit an instruction to the selected device 104*a*, to cause the selected device 104*a* to activate a local relay operating mode. The controller device 104*a*-3 can also broadcast an indication, to the other devices 104*a* in the same pool, that a local relay has been selected. The other devices 104*a* can, in some examples, initiate a controller timeout period (e.g., specified in the configuration file) upon conclusion of the discovery process at block 325. If the controller timeout period expires and no indication has been received from a controller device indicating that a local relay has been selected, each device 104*a* can be configured to implement a backup local relay assignment process. For example, each device 104*a* can determine whether to activate the local relay mode, based on a local IP address or other attribute. In some examples, the determination can be whether the device 104*a* has the second-lowest IP address of those discovered at block 325. The backup local relay assignment process permits the pool of devices 104 to proceed with the update operation in the event that the controller device (e.g., the device 104*a*-3, in this example) fails or is interrupted before selecting a local relay device.

At block 340, following selection of a local relay device (for the controller device 104*a*-3) or receipt of an instruction or the above indication (for the non-controller devices 104*a*), each device 104*a* is configured to determine whether it has been selected as the local relay device. When the determination at block 340 is negative, the device 104*a* activates (or remains in) the client operating mode, and proceeds to block 345. When the determination at block 340 is affirmative, the device 104*a* proceeds to block 350.

Figure 7:
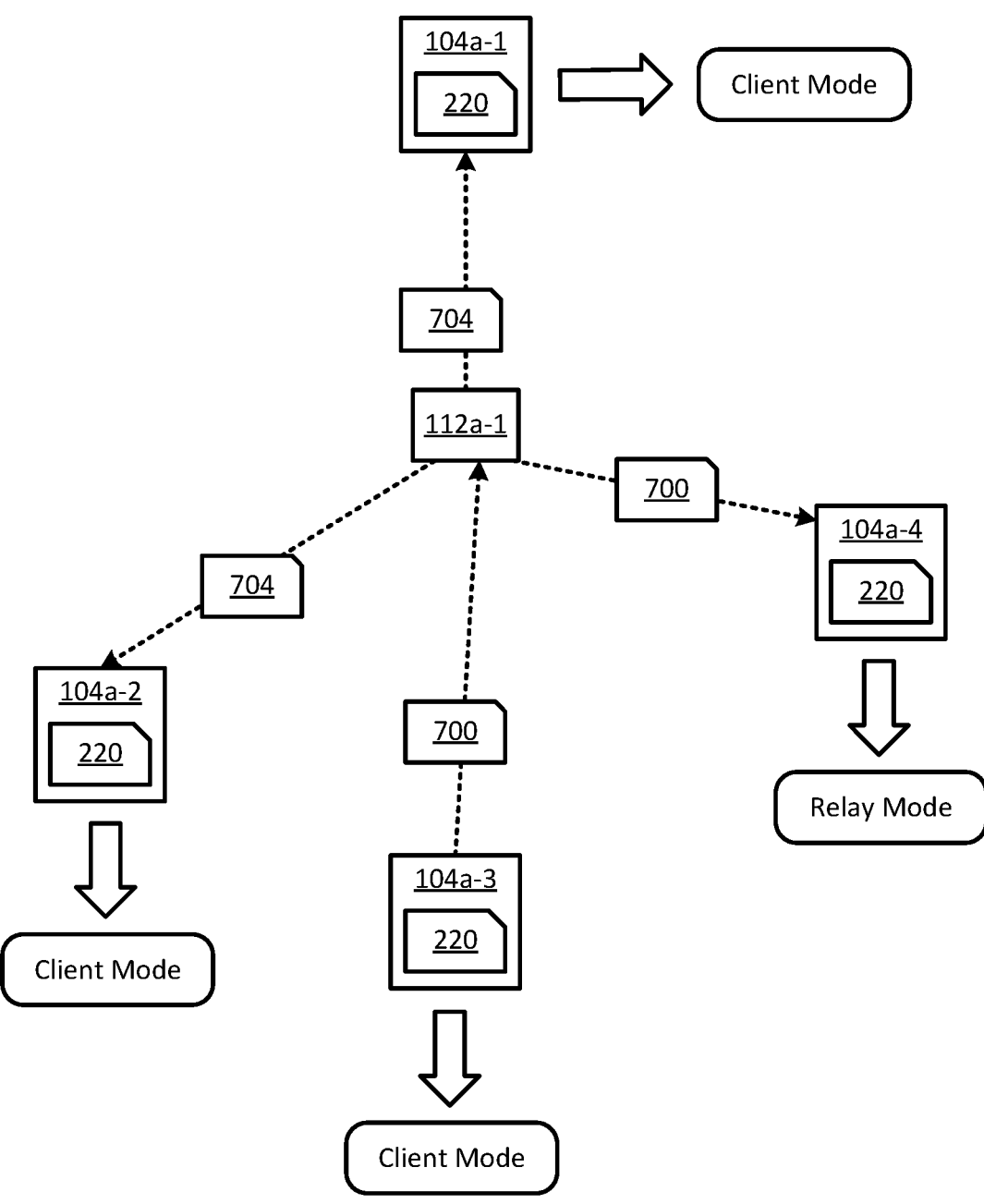
FIG. 7 is a diagram illustrating example performances of blocks 335 and 340 of the method of FIG. 3.

FIG. 7 illustrates an example performance of blocks 335 and 340 in the pool of devices 104*a*-1 to 104*a*-4. In particular, the device 104*a*-3 is shown transmitting an instruction 700 to the device 104*a*-4, in response to selecting the device 104*a*-4 as the local relay. The device 104*a*-3 also transmits an indication 704 to each of the devices 104*a*-1 and 104*a*-2, indicating that a local relay has been selected. In response to sending the instruction 700 and the indications 704, the device 104*a*-3 activates a client operating mode. The devices 104*a*-1 and 104*a*-2, in response to receiving the indications 704, activate or remain in the client operating mode. The devices 104*a*-1, 104*a*-2, and 104*a*-3 therefore proceed to block 345. The device 104*a*-4, in response to receiving the instruction 700, activates the local relay operating mode and proceeds to block 350.

Returning to FIG. 3, the device 104*a*-4, at block 350, is configured to obtain the update file(s) from the device management subsystem 124. In some examples, if the device 104*a*-4 already has a local copy of the update file(s), block 350 can be omitted and the device 104*a*-4 can proceed directly to block 355. At block 355, the device 104*a*-4 (and generally, any device 104 operating in the local relay mode) listens for and responds to local relay search requests. At block 345, any devices 104 operating in the client mode are configured to transmit periodic local relay search requests. A local relay search request can include a broadcast message identified as a local relay search request. The broadcast message can contain a network identifier (e.g., an IP address) of the requester (e.g., the device 104 that initiated the broadcast). In response to detecting a search request, the device 104*a*-4 is configured to transmit a response to the requesting device 104*a*, the response containing a network identifier of the device 104*a*-4 (e.g., an IP address), as well as a network identifier of the update file (e.g., a URL corresponding to a storage location in the memory 204 of the device 104*a*-4).

The devices 104*a* operating in the client mode can be configured to transmit search requests at a configurable frequency, until a response is received or until the update operation ends (e.g., the end of the run time specified in the configuration file 220 is reached). To mitigate peaks in network traffic resulting from search requests, the client-mode devices 104*a* can apply offset times to search requests, e.g., as shown in the configuration file 220 illustrated in FIG. 4. In this example, the client-mode devices 104*a* can be configured to transmit search requests with a frequency of sixty seconds, but with randomly-selected offsets between zero and three hundred seconds, reducing the likelihood of numerous devices 104*a* transmitting search requests substantially simultaneously.

In response to receiving a response from the local relay device 104*a*-3, each client-mode device 104*a* is configured to proceed to block 360. At block 360, the client-mode devices 104*a* are configured to transmit requests to the local relay device 104*a*-3 for the update file(s), using the URL or other network identifier received at block 345. The requests transmitted by the client-mode devices 104*a* at block 360 can also be timed according to the frequency and offset settings noted above (and illustrated in FIG. 4) in connection with block 345.

As will now be understood, when blocks 310 and 315 are implemented, any devices in the second wave are configured to proceed to block 320 after expiry of the wait timer. Block 320 can be performed in the same way as block 345, as described above. When the wait timer has expired, the discovery process set out above is complete, and a local relay has been assigned. Therefore, the determination at block 320 for devices 104 in the second wave is likely to be affirmative, and those devices can proceed directly to block 360. In the event that the discovery process fails, the devices 104 of the second wave make a negative determination at block 320 and can initiate a further discovery process.

The local relay device 104*a*-3, at block 365, is configured to receive requests for the update file(s) from the client-mode devices 104*a*, and to respond to each such request by initiating an upload of the update file(s) to the requesting device 104*a*, until a maximum number of simultaneous uploads specified in the configuration file 220 is reached. In the present example, as shown in FIG. 4, the number of simultaneous file transfers permitted is four, and the device 104a-3 is therefore permitted to initiate file uploads to each of the devices 104a-1, 104a-2, and 104a-3 simultaneously. In other examples, when the maximum permitted number of simultaneous transfers is smaller than the number of devices 104 in a pool, the local relay device can ignore further transfer requests once the maximum permissible number of transfers are ongoing (until one or more ongoing transfers is complete). The client-mode devices 104 can therefore repeat the transmission of file requests periodically, as noted above.

Figure 8:
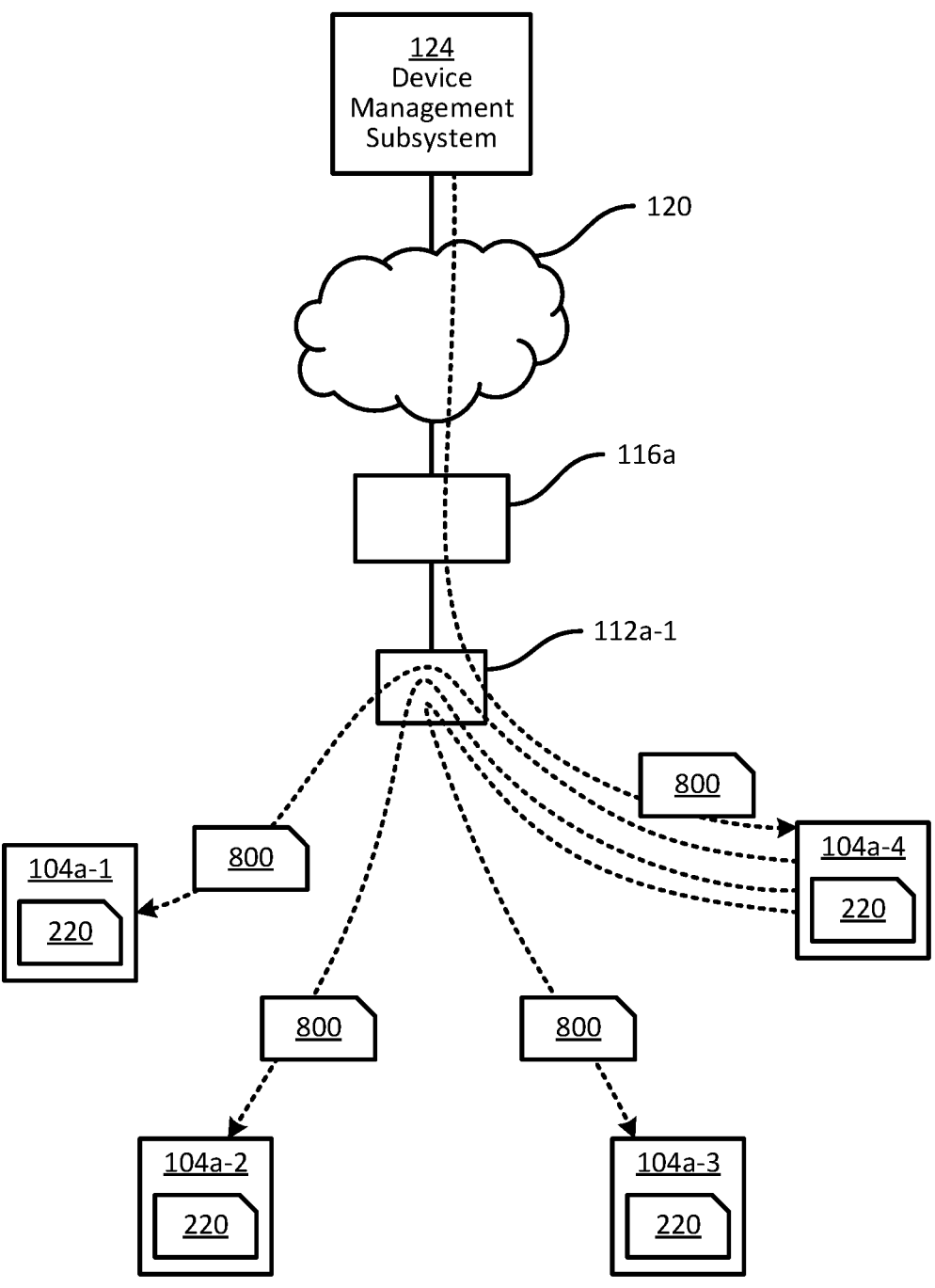
FIG. 8 is a diagram illustrating example performances of blocks 350, 360, and 365 of the method of FIG. 3.

Turning to FIG. 8, example performances of blocks 350, 360, and 365 are illustrated. In particular, the device 104a-4 is shown downloading an update file 800 from the subsystem 124. Further, the device 104a-4 is shown transferring the file 800 to each of the devices 104a-1, 104a-2, and 104a-3, e.g., following transfer requests from each of those devices 104a. As will be understood, the transfers of the file 800 to the client-mode devices 104a occurs within the subnetwork managed by the router 112a-1, and therefore imposes little or no load on the gateway 116a or the subsystem 124.

Following completion of a file transfer, each client-mode device 104a can be configured to apply the update (e.g., an update to the OS 212). The specific nature of the update application can vary with the form in which the update is deployed (e.g., a file, a set of files, a compressed archive, or the like). In some examples, e.g., with larger numbers of devices 104 in a pool, certain devices 104 may not have received copies of the file 800 by the end of the run time specified in the configuration file 220. In such examples, the update operation ceases, e.g., at the specified end time of 5:00 am, but begins anew at 2:00 am of the following day. If the local relay device 104 selected in the previous performance of the method 300 is active the following day, the determination at block 320 is affirmative, and the discovery process may therefore be skipped, with client-mode devices transitioning directly to block 360 to resume attempts to download the update file 800.

In some examples, the local relay device selected at block 355 may become inactive (e.g., powered off, low battery, or engaged in another process that prevents execution of the application 216). Although a new local relay device can be assigned by repeating the discovery process noted above, the system 100 can also implement further functionality to dynamically assign further local relay devices without the use of a controller device 104.

Figure 9:
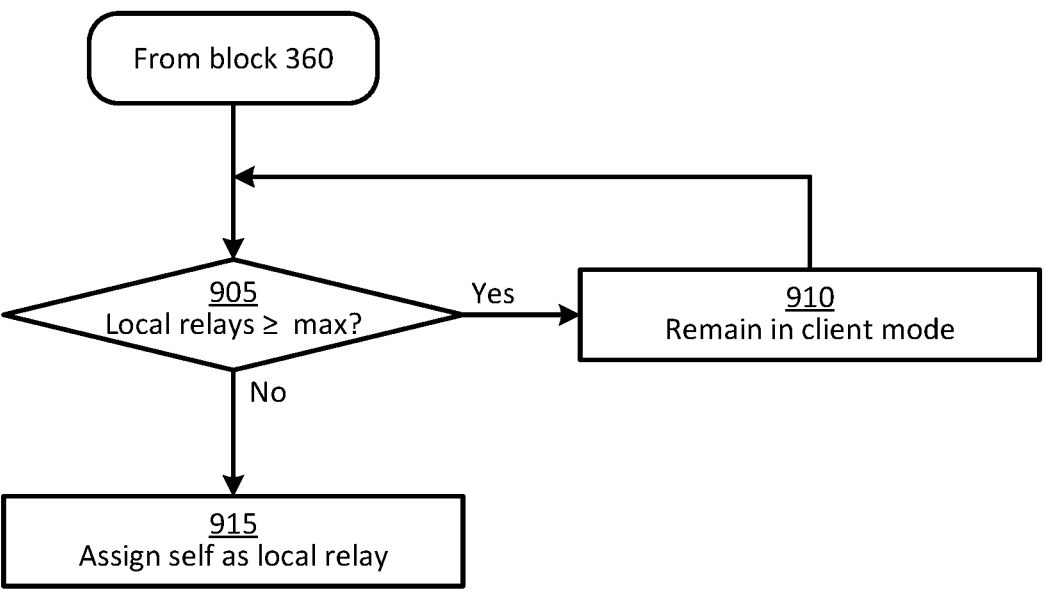
FIG. 9 is a flowchart of a self-healing extension to method of FIG. 3.

As shown in FIG. 9, following block 360 (e.g., including confirming file integrity of the transferred file, e.g., via a cyclic redundancy check), any client-mode device 104 can determine at block 905 whether the current number of active local relay devices has reached or exceeded a maximum number of local relays specified in the configuration file 220. As shown in FIG. 4, in this example the maximum number of local relays is two (although a wide variety of other limits can be specified in other examples). The determination at block 905 can be performed by broadcasting a local relay search request as described in connection with block 345.

When the determination at block 905 is affirmative, the client-mode device 104 is configured to remain in the client mode at block 910, although the device 104 can be configured to repeat the determination at block 905 periodically. When the determination at block 905 is negative (e.g., when the number of responses received from local relays is smaller than the maximum allowable number of local relays), at block 915 the device 104 is configured to self-assign as a local relay device. In other words, the device 104 is configured to activate the local relay mode and begin responding to local relay search requests and transfer requests, without having been selected as a local relay by a controller device. The performance of blocks 905 to 915 permits the system 100 to be self-healing, in that the loss of a local relay device due to low battery and/or other activities preventing execution of the application 216 may lead to other devices 104 becoming local relays.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a first client computing device among a plurality of client computing devices connected to a local area network, the method comprising:

storing configuration data;

receiving an update instruction from a device management subsystem external to the local area network;

in response to receiving the update instruction, determining that the first client computing device satisfies a first wave condition defined in the configuration data where the first wave condition is based on an attribute of an identifier of the first client computing device, and obtaining status data via the local area network for each of the client computing devices;

based on the status data, determining whether to activate a controller operating mode at the first client computing device;

in response to activating the controller operating mode, selecting, at the first client computing device, one of the plurality of client computing devices to operate in a local relay operating mode;

instructing the selected client computing device to activate the local relay operating mode, for causing the selected client computing device to obtain an update file from the device management subsystem and to deploy the update file to the client computing devices via the local area network.

2. The method of claim 1, wherein the plurality of client computing devices each belong to a subnetwork of the local area network.

3. The method of claim 1, wherein the status data includes respective network identifiers for the plurality of client computing devices; and wherein determining whether to activate the controller operating mode includes:

determining that a local network identifier of the client computing device is smaller than each of the respective network identifiers.

4. The method of claim 1, further comprising:

obtaining the status data according to the configuration data.

5. The method of claim 4, further comprising: obtaining status data at a start time specified in the configuration data.

6. The method of claim 4, wherein the configuration data defines a time period for obtaining the status data; the method further comprising initiating the determination of whether to activate the controller operating mode after the time period has expired.

7. The method of claim 1, further comprising:

in response to instructing the selected client computing device to activate the local relay operating mode, activating a client operating mode at the first client computing device.

8. The method of claim 7, further comprising:

in response to activating the client operating mode, transmitting a search request for local relays;

receiving a message from the selected client computing device containing a network identifier of the update file at the selected client computing device; and transmitting a transfer request to the selected client computing device for the update file.

9. The method of claim 8, further comprising: when no response to the transfer request is received, transmitting a further transfer request.

10. The method of claim 8, further comprising:

receiving the update file and storing the update file at the first client computing device.

11. The method of claim 10, further comprising:

in response to receiving the update file, determining whether to activate the local relay operating mode at the first client computing device.

12. A computing device, comprising:

a communications interface configured to establish a connection to a local area network;

a memory storing configuration data; and a processor configured to:

receive, via the communications interface, an update instruction from a device management subsystem external to the local area network;

in response to receiving the update instruction, determine that the first client computing device satisfies a first wave condition defined in the configuration data where the first wave condition is based on an attribute of an identifier of the first client computing device, and obtain status data from a plurality of client computing devices connected to the local area network;

based on the status data, determine whether to activate a controller operating mode at a first client computing device;

in response to activating the controller operating mode, select one of the plurality of client computing devices to operate in a local relay operating mode;

instruct the selected client computing device to activate the local relay operating mode, for causing the selected client computing device to obtain an update file from the device management subsystem and to deploy the update file to the client computing devices via the local area network.

13. The computing device of claim 12, wherein the plurality of client computing devices each belong to a subnetwork of the local area network.

14. The computing device of claim 12, wherein the status data includes respective network identifiers for the plurality of client computing devices; and wherein the processor is configured to determine whether to activate the controller operating mode by:

determining that a local network identifier of the client computing device is smaller than each of the respective network identifiers.

15. The computing device of claim 12, wherein the processor is configured to obtain the status data according to the configuration data.

16. The computing device of claim 15, wherein the processor is further configured to:

obtain status data at a start time specified in the configuration data.

17. The computing device of claim 15, wherein the configuration data defines a time period for obtaining the status data; and wherein the processor is further configured to initiate the determination of whether to activate the controller operating mode after the time period has expired.

18. The computing device of claim 12, wherein the processor is further configured to:

in response to instructing the selected client computing device to activate the local relay operating mode, activate a client operating mode at the first client computing device.

19. The computing device of claim 18, wherein the processor is further configured to:

in response to activating the client operating mode, transmit a search request for local relays;

receive a message from the selected client computing device containing a network identifier of the update file at the selected client computing device; and transmit a transfer request to the selected client computing device for the update file.

20. The computing device of claim 19, wherein the processor is further configured to:

when no response to the transfer request is received, transmit a further transfer request.

21. The computing device of claim 19, wherein the processor is further configured to:

receive the update file and store the update file in the memory.

22. The computing device of claim 21, wherein the processor is further configured to:

in response to receiving the update file, determine whether to activate the local relay operating mode.

* * * * *